United States Patent
Sohn et al.

(10) Patent No.: US 11,368,422 B1
(45) Date of Patent: Jun. 21, 2022

(54) SYSTEMS AND METHODS FOR CONTROLLING ELECTRONIC MESSAGE TRANSMISSIONS

(71) Applicant: SHOPIFY INC., Ottawa (CA)

(72) Inventors: Mary-Juen Sohn, Montréal (CA); Brooke Fitzgerald, Montréal (CA); Tengke Xiong, Lasalle (CA)

(73) Assignee: SHOPIFY INC.

( * ) Notice: Subject to any disclaimer, the term of this patent is extended or adjusted under 35 U.S.C. 154(b) by 0 days.

(21) Appl. No.: 17/198,986

(22) Filed: Mar. 11, 2021

(51) Int. Cl.
| | | |
|---|---|---|
| *H04L 51/00* | (2022.01) | |
| *H04L 51/48* | (2022.01) | |
| *H04L 61/45* | (2022.01) | |
| *H04L 51/23* | (2022.01) | |
| *H04L 51/42* | (2022.01) | |
| *H04L 51/212* | (2022.01) | |

(52) U.S. Cl.
CPC ............ *H04L 51/212* (2022.05); *H04L 51/23* (2022.05); *H04L 51/42* (2022.05); *H04L 51/48* (2022.05); *H04L 61/4555* (2022.05)

(58) Field of Classification Search
CPC ......... H04L 51/12; H04L 51/22; H04L 51/28; H04L 51/30; H04L 60/1564
USPC ....................................................... 709/206
See application file for complete search history.

(56) References Cited

U.S. PATENT DOCUMENTS

| | | | | |
|---|---|---|---|---|
| 7,490,128 B1 * | 2/2009 | White | ..................... | H04L 51/12 |
| | | | | 709/204 |
| 8,392,357 B1 * | 3/2013 | Zou | ......................... | H04L 51/12 |
| | | | | 707/602 |
| 2008/0082658 A1 * | 4/2008 | Hsu | ........................ | H04L 51/12 |
| | | | | 709/224 |
| 2014/0372363 A1 | 12/2014 | Chestnut | | |
| 2015/0288715 A1 * | 10/2015 | Hotchkiss | ........... | H04L 63/0876 |
| | | | | 726/7 |
| 2018/0097759 A1 | 4/2018 | Brechbuhl | | |
| 2018/0219818 A1 | 8/2018 | Kramer | | |

(Continued)

FOREIGN PATENT DOCUMENTS

| | | | | | |
|---|---|---|---|---|---|
| CN | 112751743 A | * | 5/2021 | | |
| WO | WO-2008050743 A1 | * | 5/2008 | ........... | H04L 51/066 |
| WO | WO-2018167755 A2 | * | 9/2018 | ............. | G06F 21/56 |

OTHER PUBLICATIONS

Mpamugo, Chinyere—United States Patent and Trademark Office, "Office Action" for U.S. Appl. No. 16/930,916 dated Apr. 14, 2021.
(Continued)

*Primary Examiner* — James E Springer
(74) *Attorney, Agent, or Firm* — Ridout & Maybee LLP

(57) ABSTRACT

Methods and systems for controlling electronic message transmission are described. An example method may include: receiving, via a network, an error report generated based on a response from a recipient email server responsive to an attempt to send a message to an email address associated with the recipient email server, the error report indicating that the attempt to send the message was rejected by the recipient email server; adding the email address to a block list, wherein any subsequent attempt to send messages to the email address is blocked based on the email address being in the block list; and removing the email address from the block list after a defined period of time.

25 Claims, 7 Drawing Sheets

(56) References Cited

U.S. PATENT DOCUMENTS

2019/0058717 A1\* 2/2019 Chailytko ............ H04L 61/3025
2020/0412886 A1\* 12/2020 Saito ....................... H04L 51/08

OTHER PUBLICATIONS

United States Patent and Trademark Office, "Office Action" for U.S. Appl. No. 16/930,916, dated Jul. 7, 2021.
United States Patent and Trademark Office, "Office Action" for U.S. Appl. No. 16/930,916, dated Feb. 2, 2022.

\* cited by examiner

2300B → mx.mailserver.com rejected your message to the following email addresses: ⟵2500

'exampleEmailAddress@mailserver.com' ⟵2600

The email address you entered couldn't be found. Please check the recipient's email address and try to resend the message. If the problem continues, please contact your helpdesk.

mx.mailserver.com gave this error:
The email account that you tried to reach does not exist. Please try double-checking the recipient's email address for typos or unnecessary spaces.

---

Diagnostic information for administrators: ⟵2700

Generating server: v123.e-mailServiceProvider.com ⟵2710

Total retry attempts: 1 ⟵2720 exampleEmailAddress@mailserver.com ⟵2600 mx.mailserver.com ⟵2500 ⟵2730

Remote Server returned: 550-5.1.1 The email account that you tried to reach does not exist. ⟵2750

Please try 550-5.1.1 double-checking the recipient's email address for typos or 550-5.1.1 unnecessary spaces.

E-Commerce Platform | Search | JG John's Apparel / Jonny B. Good

- Home
- Orders
- Products
- Customers
- Reports
- Discounts
- Apps

SALES CHANNELS
- Online Store
- Mobile App

View all channels

Settings

Good afternoon, Jonny B.
Here's what's happening with your store today.

Today's total sales | Today's visits
$98.00 | 1

- Update your Platform Payments tax details
  We require additional information to verify your identity.
  [Update tax details]

- Advanced Cash on Delivery has been deactivated for your store
  [See why]

All channels ▾ | Today ▾

TOTAL SALES
$98.00

$125
$75
$25

12am  8pm  4pm  11pm
        Jun 1
        2 orders

TOTAL SALES BY CHANNEL | View dashboard
                        Jun 1

Online Store          0 orders
$0.00

Mobile app            0 orders
$0.00

Shopify POS (126 York St)   0 orders
$0.00

SYSTEMS AND METHODS FOR CONTROLLING ELECTRONIC MESSAGE TRANSMISSIONS

FIELD

The present disclosure is related to controlling electronic message transmissions. In particular, the present disclosure relates to systems and methods for controlling email messages based on a temporary block list.

BACKGROUND

An email service system provides email transmission service to users. The email service system is considered the sender of the emails that the users compose and send to their list of recipients.

When an email message from a user of the system to a recipient email address is rejected by the recipient email server (e.g., Gmail™) due to the email address being invalid or outdated, the email service system may be viewed by the recipient email server to be a less credible or less reputable email service provider. As such, the email reputation of the email service system is dependent on its users sending emails that are generally well-received by the recipients.

Unsuccessful delivery of an email message due to invalid or outdated recipient email address(es) adversely affects the reputation and trustworthiness of a sender, as measured at the recipient email servers. A sender who continually sends emails to email addresses that do not exist wastes computing resources and may be viewed as demonstrating that the sender does not know the recipients very well, which can be considered an indicator of spamming behaviour.

In some existing solutions, a rejected recipient email address may be permanently removed by an email service system, such that the system may permanently block all attempts to send emails to the rejected recipient email address. In some cases, the email service may even prevent the original sender of the rejected email message (e.g., the user account associated with the sender of the email message) from sending any further messages.

SUMMARY

A method and system for an email service system to manage and control transmission of electronic messages are provided. The email service system may add and temporarily store rejected email addresses to a block list. The reason for adding a rejected email address to a block list can include for example, non-existent or outdated email addresses. After a specified expiry time, the email address can be removed from the block list. Email messages intended for an email address in the block list are automatically blocked from being sent by the email service system, which may use an internal or external (e.g., remote) email server to send one or more emails.

Instead of permanently blocking a rejected email address based on a rejection from a recipient email server, the disclosed system implements a flexible scheme with a specified expiry time for each blocked email address, such that the email address may be removed from the block list when deemed appropriate by the email service system. Once removed from the block list, messages may be permitted to be sent to the email address again.

Examples of the present disclosure may help to avoid waste of computing and network resource, by blocking transmission of electronic messages to invalid recipient email addresses. Further, examples of the present disclosure enable a blocked recipient email address to be automatically removed from the block list after an amount of time, without necessarily requiring human intervention. Thus, the present disclosure provides methods and systems that enable fully computer-implemented management of electronic communications, without necessarily relying on human judgement to decide whether or not to block or unblock a recipient email address.

In some example aspects, the present disclosure describes a computer-implemented method for controlling electronic message transmission, the method may include: receiving, via a network, an error report generated based on a response from a recipient email server responsive to an attempt to send a message to an email address associated with the recipient email server, the error report indicating that the attempt to send the message was rejected by the recipient email server; adding the email address to a block list, wherein any subsequent attempt to send messages to the email address is blocked based on the email address being in the block list; and removing the email address from the block list after a defined period of time.

In some embodiments, the error report may be generated by a Simple Mail Transfer Protocol (SMTP) server and may include one or more SMTP status codes.

In some embodiments, the method may include determining the defined period of time based on at least one of: a username of the email address; a domain of the email address; a reason for rejection indicated in the error report; and historical data related to the email address.

In some embodiments, the historical data may include data indicating previous times, if any, that the email address has been rejected by a recipient email server.

In some embodiments, the defined period of time may be set to be equal to or greater than a first minimum period of time when the username of the email address is categorized as being human-generated, and the defined period of time may be set to a longer second minimum period of time when the user name of the email address is categorized as being machine-generated.

In some embodiments, the defined period of time may be set to a longest third minimum period of time responsive to the reason for rejection indicated in the error report being that the domain of the email address does not exist.

In some embodiments, the method may include, subsequent to removing the email address from the block list: receiving a request to send a further message to the email address; determining that the email address is not in the block list; and permitting the request to send the further message to the email address.

In some embodiments, permitting the request to send the further message to the email address may include: determining an email server from a plurality of available email servers for sending the further message to the email address based on a reputation level of the determined email server relative to the rest of the email servers from the plurality of available email servers; and permitting the request to send the further message to the email address using the determined email server.

In some embodiments, the method may include, prior to an expiration of the defined period of time: sending the email address to an external email validator for verification; receiving, from the external email validator, a confirmation that the email address is valid; and in response to receiving the confirmation that the email address is valid, removing the email address from the block list.

In some embodiments, the method may include, prior to an expiration of the defined period of time: receiving, from a user account, a request to send a further message to the email address; permitting the request to send the further message to the email address; receiving a confirmation that the email address is valid; and in response to receiving the confirmation that the email address is valid, removing the email address from the block list.

In some embodiments, the method may include: prior to permitting the request to send the further message to the email address, determining that the user account is a trusted user account based on historical data.

In some embodiments, the error report may indicate at least one of: the email address being invalid; the email address does not exist; the email address being outdated; or the email address being inactive.

In some embodiments, the method may include: periodically checking each entry in the block list, wherein the email address is removed from the block list responsive to detecting, as a part of a periodic check, that the defined period of time has passed.

In some example aspects, the present disclosure describes a system for controlling electronic message transmission, the system comprising a processor in communication with storage, the processor configured to execute instructions from the storage to cause the system to: receive, via a network, an error report generated based on a response from a recipient email server responsive to an attempt to send a message to an email address associated with the recipient email server, the error report indicating that the attempt to send the message was rejected by the recipient email server; add the email address to a block list, wherein any subsequent attempt to send messages to the email address is blocked based on the email address being in the block list; and remove the email address from the block list after a defined period of time.

In some embodiments, the processor may be further configured to execute instructions from the storage to cause the system to: determine the defined period of time based on at least one of: a username of the email address; a domain of the email address; a reason for rejection indicated in the error report; and historical data related to the email address.

In some embodiments, the historical data may include data indicating previous times, if any, that the email address has been rejected by a recipient email server.

In some embodiments, the defined period of time may be set to be equal to or greater than a first minimum period of time when the username of the email address is categorized as being human-generated, and the defined period of time may be set to a longer second minimum period of time when the user name of the email address is categorized as being machine-generated.

In some embodiments, the defined period of time may be set to a longest third minimum period of time responsive to the reason for rejection indicated in the error report being that the domain of the email address does not exist.

In some embodiments, the processor may be further configured to execute instructions from the storage to cause the system to, subsequent to removing the email address from the block list: receive a request to send a further message to the email address; determine that the email address is not in the block list; and permit the request to send the further message to the email address.

In some embodiments, the processor may be configured to execute instructions from the storage to cause the system to: determine an email server from a plurality of available email servers for sending the further message to the email address based on a reputation level of the determined email server relative to the rest of the email servers from the plurality of available email servers; and permit the request to send the further message to the email address using the determined email server.

In some embodiments, the processor may be configured to execute instructions from the storage to cause the system to, prior to an expiration of the defined period of time: send the email address to an external email validator for verification; receive, from the external email validator, a confirmation that the email address is valid; and in response to receiving the confirmation that the email address is valid, remove the email address from the block list.

In some embodiments, the processor may be configured to execute instructions from the storage to cause the system to, prior to an expiration of the defined period of time: receive, from a user account, a request to send a further message to the email address; permit the request to send the further message to the email address; receive a confirmation that the email address is valid; and in response to receiving the confirmation that the email address is valid, remove the email address from the block list.

In some embodiments, the processor may be configured to execute instructions from the storage to cause the system to: prior to permitting the request to send the further message to the email address, determine that the user account is a trusted user account based on historical data.

In some embodiments, the error report may indicate at least one of: the email address being invalid; the email address does not exist; the email address being outdated; or the email address being inactive.

In some embodiments, the processor may be further configured to execute instructions from the storage to cause the system to: periodically check each entry in the block list, wherein the email address is removed from the block list responsive to detecting, as a part of a periodic check, that the defined period of time has passed.

In some examples, the system may implement an e-commerce platform.

In some examples, the processor may be configured to execute instructions to cause the system to perform any of the methods described herein.

In some example aspects, the present disclosure describes a computer-readable medium storing instructions that, when executed by a processor of a system, cause the system to: receive, via a network, an error report generated based on a response from a recipient email server responsive to an attempt to send a message to an email address associated with the recipient email server, the error report indicating that the attempt to send the message was rejected by the recipient email server; add the email address to a block list, wherein any subsequent attempt to send messages to the email address is blocked based on the email address being in the block list; and remove the email address from the block list after a defined period of time.

In some embodiments, the instructions, when executed by a processor of a system, may cause the system to: determine the defined period of time based on at least one of: a username of the email address; a domain of the email address; a reason for rejection indicated in the error report; and historical data related to the email address.

In some examples, the computer-readable medium, when executed by the processor, may cause the system to perform any of the methods described herein.

BRIEF DESCRIPTION OF THE DRAWINGS

Reference will now be made, by way of example, to the accompanying drawings which show example embodiments of the present application, and in which:

FIG. 2B is an example error report from a SMTP server when the recipient email address does not exist.

FIG. 5 is an example homepage of an administrator, which may be accessed via the e-commerce platform of FIG. 4.

Figure 1:
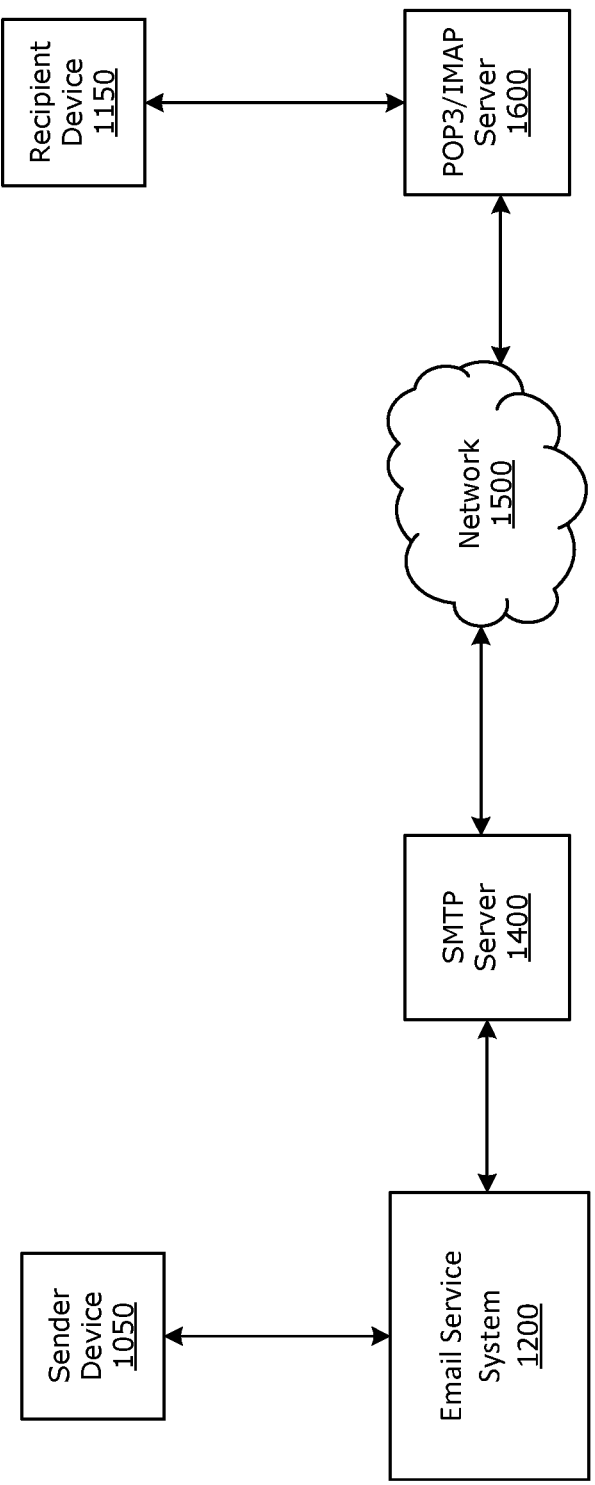
FIG. 1 is a schematic diagram showing an email service system in operation to control transmission of electronic messages, in accordance with some example embodiments.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DESCRIPTION OF EXAMPLE EMBODIMENTS

Various representative embodiments of the disclosed technology will be described more fully hereinafter with reference to the accompanying drawings. The present technology may, however, be embodied in many different forms and should not be construed as limited to the representative embodiments set forth herein.

It will be understood that when an element is referred to as being "connected" or "coupled" to another element, it can be directly connected or coupled to the other element, or intervening elements may be present (e.g., indirect connection or coupling). By contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). Additionally, it will be understood that elements may be "coupled" or "connected" mechanically, electrically, communicatively, wirelessly, optically, and so on, depending on the type and nature of the elements that are being coupled or connected.

The functions of the various elements shown in the figures, including any functional block labeled as a "processor," may be provided through the use of dedicated hardware as well as hardware capable of executing instructions, in association with appropriate software instructions. When provided by a processor, the functions may be provided by a single dedicated processor, by a single shared processor, or by a plurality of individual processors, some of which may be shared. In some implementations of the present technology, the processor may be a general-purpose processor, such as a central processing unit (CPU) or a processor dedicated to a specific purpose, such as a digital signal processor (DSP). Moreover, explicit use of the term "processor" should not be construed to refer exclusively to hardware capable of executing software, and may implicitly include, without limitation, an application-specific integrated circuit (ASIC), a field-programmable gate array (FPGA), a read-only memory (ROM) for storing software, a random access memory (RAM), and non-volatile storage. Other hardware, conventional and/or custom, may also be included.

Software modules, or simply modules or units which are implied to be software, may be represented herein as any combination of flowchart elements or other elements indicating the performance of process or operation steps and/or textual description. Such modules may be executed by hardware that is expressly or implicitly shown. Moreover, it should be understood that a module may include, for example, but without limitation, computer program logic, computer program instructions, software, stack, firmware, hardware circuitry, or a combination thereof, which provides the required capabilities. It will further be understood that a "module" generally defines a logical grouping or organization of related software code or other elements as discussed above, associated with a defined function. Thus, one of ordinary skill in the relevant arts will understand that particular code or elements that are described as being part of a "module" may be placed in other modules in some implementations, depending on the logical organization of the software code or other elements, and that such modifications are within the scope of the disclosure as defined by the claims.

The present technology may be implemented as a system, a method, and/or a computer program product. The computer program product may include a computer-readable storage medium (or media) storing computer-readable program instructions that, when executed by a processor, cause the processor to carry out aspects of the disclosed technology. The computer-readable storage medium may be, for example, an electronic storage device, a magnetic storage device, an optical storage device, an electromagnetic storage device, a semiconductor storage device, or any suitable combination of these. A non-exhaustive list of more specific examples of the computer-readable storage medium includes: a portable computer disk, a hard disk, a random access memory (RAM), a read-only memory (ROM), a flash memory, an optical disk, a memory stick, a floppy disk, a mechanically or visually encoded medium (e.g., a punch card or bar code), and/or any combination of these. A computer-readable storage medium, as used herein, is to be construed as being a non-transitory computer-readable medium. It is not to be construed as being a transitory signal, such as radio waves or other freely propagating electromagnetic waves, electromagnetic waves propagating through a waveguide or other transmission media (e.g., light pulses passing through a fiber-optic cable), or electrical signals transmitted through a wire.

It will be understood that computer-readable program instructions can be downloaded to respective computing or processing devices from a computer-readable storage medium or to an external computer or external storage device via a network, for example, the Internet, a local area network, a wide area network and/or a wireless network. A network interface in each computing/processing device may receive computer-readable program instructions via the network and may forward the computer-readable program instructions for storage in a computer-readable storage medium within the respective computing or processing device. Computer-readable program instructions for carrying out operations of the present disclosure may be assembler instructions, machine instructions, firmware instructions, configuration data for integrated circuitry, or either source code or object code written in any combination of one or more programming languages.

In some alternative implementations, the functions noted in flowcharts, flow diagrams, state transition diagrams, pseudo-code, and the like may occur out of the order noted in the figures. For example, two blocks shown in succession in a flowchart may, in fact, be executed substantially concurrently, or the blocks may sometimes be executed in the reverse order, depending upon the functionality involved. It will also be noted that each of the functions noted in the figures, and combinations of such functions can be implemented by special-purpose hardware-based systems that perform the specified functions or acts or by combinations of special-purpose hardware and computer instructions.

With these fundamentals in place, some non-limiting examples to illustrate various implementations of aspects of the present disclosure are discussed next.

As mentioned, unsuccessful delivery of email messages due to invalid or outdated recipient email addresses generally lower the email reputation of the email service system, which could create reputation issues for all users of the email service system. The disclosed systems and methods herein, when implemented, can help prevent unsuccessful delivery of email messages to invalid or outdated recipient email addresses.

FIG. 1 is a schematic diagram showing an email service system 1200 in operation to control transmission of electronic messages. The email service system 1200 may be implemented as a standalone application hosted by one or more servers, or it may be implemented as part of a larger platform. The email service system 1200 may include one or more internal email servers for transmitting and receiving email messages, though not necessary. Additionally or alternatively, the email service system 1200 may connect to one or more external email servers via a network (not shown) using a network communication protocol (e.g., an internet protocol) for transmitting and receiving email messages.

A user of the email service system 1200 may use a sender device 1050 (e.g., computer, laptop computer, mobile computing device, and the like) to connect to the email service system 1200 for sending or receiving emails. The user may be associated with a user account recognized by the email service system 1200, and may need to be logged into the user account prior to receiving or sending emails. The email service system 1200 may cause a user interface to be displayed at the sender device 1050, such as through a web browser or a mobile application, for the user to compose and send emails to one or more recipients. Each recipient is associated with a recipient email address, and each email may be sent to one or more recipient email addresses.

When the email service system 1200 receives a user command, via the user interface, to send the composed email message, the composed email message, including the recipient email address(es) are processed by the email service system 1200 and sent to a Simple Mail Transfer Protocol (SMTP) server 1400, which may be an internal or external email server. Upon receiving the composed email message and the recipient email address(es), the SMTP server 1400 may further relay the email message and the recipient email address(es) to a POP3/IMAP server 1600, which may be a Post Office Protocol version 3 (POP3) or an Internet Message Access Protocol (IMAP) server 1600, through a network 1500 (e.g., the Internet) using a network communication protocol (e.g., an internet protocol). Both POP3 and IMAP are incoming mail protocols used by email clients to retrieve messages from email servers. The POP3/IMAP server 1600 is considered a recipient email server associated with one or more recipient email address(es).

The POP3/IMAP server 1600, upon receiving the composed email message and the recipient email address(es), may verify that the recipient email address(es) is(are) valid. If any of the recipient email address(es) is invalid, the POP3/IMAP server 1600 may reject the email message intended for the invalid email address, and notify the SMTP server 1400 accordingly with an error message. Meanwhile, the email message may still be sent to one or more valid recipient email address(es), if any, and the successfully delivered email message may be received by the recipient device 1150 (e.g., using a web browser or a mobile application).

The SMTP server 1400 may receive the error message from the POP3/IMAP server 1600 regarding the rejected email message and the invalid recipient email address(es), and in turn, send an error report based on the error message to the email service system 1200. The error report may be used by the email service system 1200 to determine an action with respect to the invalid recipient email address(es).

Figure 2A:
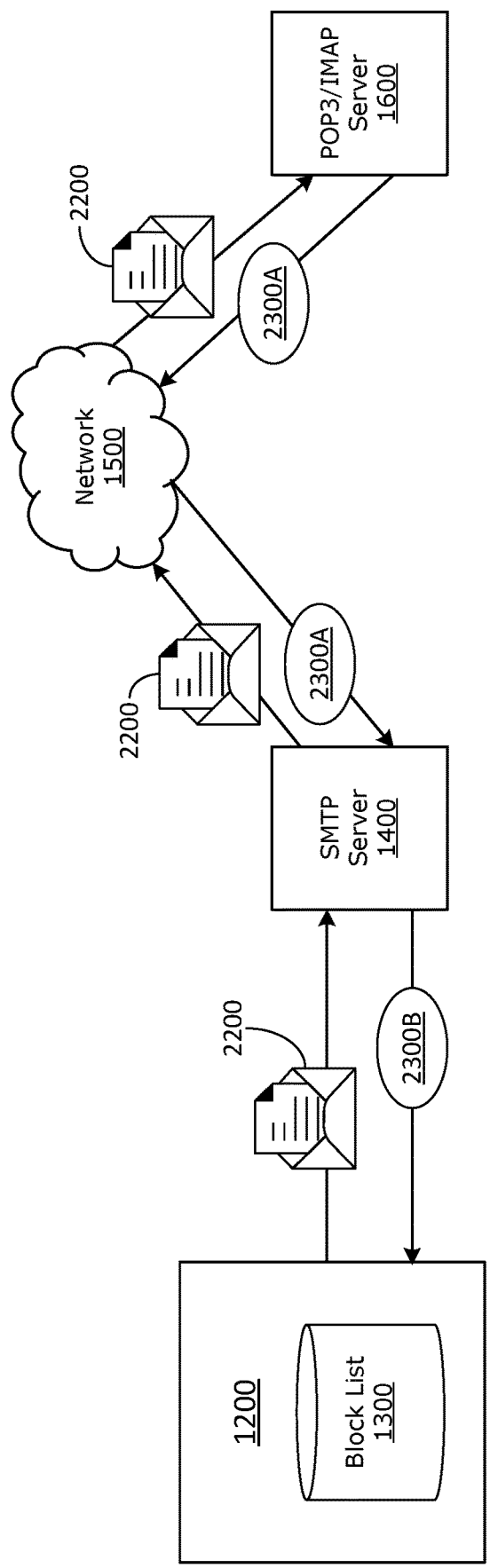
FIG. 2A is a schematic diagram showing the email service system managing a block list, in accordance with some example embodiments.

FIG. 2A is a schematic diagram showing the email service system 1200 using the error report 2300B from the SMTP server 1400 to manage a block list 1300, in accordance with some example embodiments. A composed email message 2200 including one or more recipient email addresses may be processed by the email service system 1200 and forwarded to the SMTP server 1400, which further sends the composed email message 2200 to the POP3/IMAP server 1600 via the network 1500. The POP3/IMAP server 1600 upon receiving the composed email message 2200 may verify that the recipient email address(es) is(are) valid. Once the POP3/IMAP server 1600 determines one or more recipient email address(es) is(are) invalid, the POP3/IMAP server 1600 sends an error message 2300A to the SMTP server 1400 regarding the invalid recipient email address(es) in response to receiving the composed email message 2200 including the recipient email address(es).

When the composed email message 2200 includes multiple recipient email addresses, more than one POP3/IMAP server 1600 may receive the composed email message 2200 from the SMTP server 1400, with each respective POP3/IMAP server 1600 being associated with at least one respective recipient email address from the multiple recipient email addresses.

The SMTP server 1400 receives and processes the response (i.e., the error message 2300A) from the POP3/IMAP server 1600, generates an error report 2300B based on the error message 2300A, and sends the generated error report 2300B back to the email service system 1200. In some embodiments, the error report 2300B from the SMTP server 1400 may be substantially similar or identical to the error message 2300A from the POP3/IMAP server 1600. In some embodiments, the error report 2300B from the SMTP server 1400 may be different from the error message 2300A from the POP3/IMAP server 1600. In all cases, the error report 2300B from the SMTP server 1400 is generated based on the error message 2300A from the POP3/IMAP server 1600 and may contain a specific reason as to why the email message composed at the sender device 1050 has been rejected by the POP3/IMAP server 1600.

As an example, FIG. 2B shows an error report 2300B from the SMTP server 1400 to the email service system 1200 when a recipient email address does not exist. The error report 2300B may include one or more of: 1) address 2500 of the recipient email server, which in this case is the address 2500 of the POP3/IMAP server 1600, i.e., "mx.mailserver.com"; 2) the recipient email address 2600, which is "exampleEmailAddress@mailserver.com"; and 3) diagnostic information 2700 that includes a reason for rejecting the email message 2200.

In some embodiments, when the email message 2200 has been rejected due to issues with the recipient email address 2600, the diagnostic information 2700 may include one or more of: 1) address 2710 of the SMTP server 1400, which is "v123.emailServiceProvider.com"; 2) a total number of retry attempts 2720 to transmit the email message; 3) the recipient email address 2600, which is "exampleEmailAddress©mailserver.com"; 4) address 2500 of the POP3/IMAP server 1600, i.e., "mx.mailserver.com"; 5) a SMTP status code 2730, which is "550-5.1.1" in this example; and 6) a narrative 2750 corresponding to the SMTP status code, which in this example is "the email account that you tried to reach does not exist."

Referring back to FIG. 2A, when the email message 2200 has been rejected by the recipient email server, i.e., the POP3/IMAP server 1600, due to issues with the recipient email address 2600, a return-to-sender error message 2300A response is generated by the POP3/IMAP server 1600 and sent to the SMTP server 1400 to help diagnose the issue. The SMTP server 1400 further generates an error report 2300B based on the error message 2300A and sends the error report 2300B to the email service system 1200. Permanent delivery failures may occur when the email message 2200 is rejected by the POP3/IMAP server 1600, which does not attempt delivery of the email message 2200. A common reason for a permanent delivery failure is that the recipient email address is invalid, which may be a result of, for example: an email address that does not exist; an outdated email address; or an inactive email address.

An email address ABC@domain.com typically contains two parts: a username "ABC" and a domain name "domain.com". An invalid email address may be an email address that does not exist, e.g., an email address that has never been created, which may include an erroneous email address that contains typological errors or misspellings in the username or the domain name of the email address. An invalid email address may be an outdated email address with an outdated domain in the domain name: for instance, an email address associated with an email server that is no longer in existence or no longer provides email service. An invalid email address may be an inactive email address associated with an email user account that is no longer active and cannot be used to send nor receive any email messages.

Figure 3:
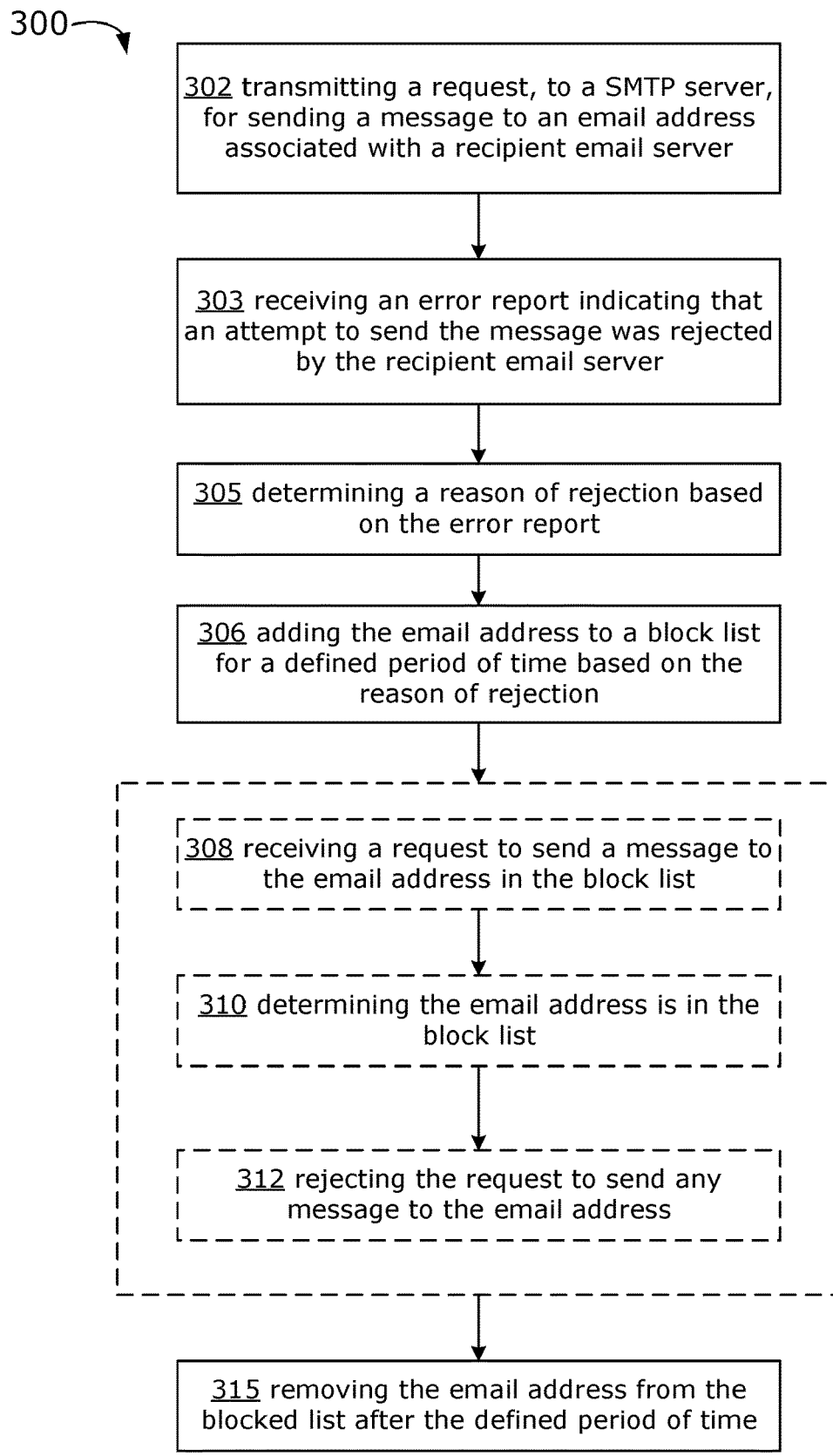
FIG. 3 is a flowchart illustrating an example method for controlling transmission of electronic messages, which may be implemented using the email service system of FIG. 1.

In some embodiments, the error report 2300B sent to the email service system 1200 may include an indication as to whether the email message has been delivered, deferred, or rejected permanently. The email service system 1200 (hereinafter the "system 1200") may be configured to process the error report 2300B in order to manage a block list 1300 in accordance with an example method described in FIG. 3, which shows a flowchart illustrating an example method 300 for controlling transmission of electronic messages such as email messages.

At operation 302, the system 1200 may generate and transmit a command to send an email message 2200 to a recipient email address 2600 associated with a recipient email server 1600 (which may be, as described above, a POP3/IMAP server). The system 1200 may include an internal email server (e.g., an internal SMTP server) for transmitting the email message 2200 to one or more recipient email addresses including the email address 2600. The system 1200 may also send the command to an external email server (e.g., an external SMTP server, such as a SendGrid™ email server) for sending the email message 2200 to one or more recipient email addresses.

In some embodiments, the system 1200 may use two or more different email servers for sending email messages to a list of recipient email addresses. For example, the system 1200 may use a first email server with a high reputation level to send email messages to one or more recipient email addresses that have been previously proven to be valid, or at least valid in a predefined period of time (e.g., within the last twelve months) immediately preceding the sending of the email message, and use a second email server with a normal or lower reputation to send email messages to one or more recipient email addresses that have been recently rejected as invalid, outdated, or inactive in the predefined period of time. This configuration means that the first email server with a high reputation level is less likely to send email messages to invalid, outdated or inactive email addresses, and more likely to keep its reputation level high.

In some embodiments, the system 1200 may use the highest reputation email server only for sending email messages from user accounts who have been registered with the system 1200 for at least a year, or who are paid subscribers to the system 1200.

By way of background, an email server reputation can be a score ("reputation score") assigned to a server that sends email. Each email service provider system (e.g. Gmail™) may determine and assign the reputation score of each email server based on its own set of factors. Generally speaking, the higher the reputation score, the more likely email messages sent from the email server are delivered successfully to the recipient email addresses. For example, a good or high reputation score assigned to an email server XYZ by an email service provider system ABC may indicate that emails sent from the email server XYZ to recipients using the email service provider system ABC will be delivered with a zero or low rate of rejection (e.g., less than 2%, or at least a rate below what is generally accepted in the industry for standard email communications), assuming the recipient email addresses are valid. On the other hand, if the reputation score of an email server falls below a certain threshold, the email messages may be sent to recipients' spam folders or rejected outright by the email service provider system ABC While each email service provider system determines its own factors for computing a reputation score, example common factors for determining a reputation score of an email server XYZ may include, but not limited to: an amount of email sent by the email server XYZ; the number of recipients that have marked one or more emails from the email server XYZ as spam; the number of rejected email messages from the email server due to invalid recipient email addresses; how many email messages have been opened, replied to, forwarded, deleted; how many links within email messages are clicked by recipients once the email messages have been opened; and how many recipients have unsubscribed from emails coming from the email server XYZ.

In some embodiments, the system 1200 may have multiple email servers, while each email server has its own reputation score determined by each email service provider system. For example, the system 1200 may have three different email servers, and each email server may each have two reputation scores including a first reputation score determined by a first email service provider system (e.g. Gmail™) and the second reputation score determined by a second email service provider system (e.g., Yahoo™). There are certain methods of determining a reputation score of an email server as determined by one or more email service provider systems. For instance, Gmail™ provides a tool called Postmaster Tools to help organizations analyze email performance of an email server or domain.

At operation 303, the system 1200 may receive an error report 2300B indicating that the attempt to send the email message 2200 was rejected by the recipient email server 1600, which may be, for example, a POP3/IMAP server 1600 associated with a recipient email address 2600. The error report 2300B may be generated by the SMTP server 1400, based on an error message 2300A from the recipient email server 1600. The error report 2300B may, as described above, include: 1) the address 2500 of the recipient email server; 2) the recipient email address 2600; and/or 3) diagnostic information 2700 that includes a reason for rejecting the email message 2200.

At operation 305, the system 1200 may determine a reason of rejection based on the error report 2300B. The system 1200 may do so using text analyzing, such as text parsing using regular expression (Regex), to determine a specific reason for rejection of the email message 2200. In some embodiments, the system 1200 may determine the reason for rejection based on one or more SMTP status code 2730 in the error report 2300B, as shown in FIG. 2B. Additionally or alternatively, the system 1200 may determine the reason for rejection based on one or more narratives 2750 in the error report 2300B, also illustrated in FIG. 2B.

In some embodiments, SMTP status codes 2730 may be defined in a current standard (e.g., SMTP standard RFC 5321) and registered at the SMTP Enhanced Status Code Registry (the "Status Code Registry"). A copy of the latest version of SMTP Enhanced Status Codes Registry is accessible at https://www.iana.org/assignments/smtp-enhanced-status-codes/smtp-enhanced-status-codes.xhtml, updated on Nov. 27, 2019 and accessed on Mar. 9, 2021, the entirety of which is herein incorporated by reference. In other embodiments, the SMTP status codes 2730 may be defined by the recipient email server 1600, and/or the SMTP server 1400. Regardless of the origin of definition for the status codes, each status code 2730 generally has a commonly accepted meaning. For example, status codes starting with 5 (e.g., starting with "5xx") may generally indicate a permanent failure, which means the issue is unlikely to be resolved by resending the email message 2200 in its current form; this is often caused by the recipient email address being invalid, outdated, expired, or otherwise unavailable.

For example, based on the Status Code Registry mentioned above, "5.1.1" or "5xx.1.1" may indicate a bad destination mailbox address, which means the mailbox specified in the address does not exist. More specifically, this status code 2730 may indicate that the address portion in the recipient email address to the left of the "@" sign (i.e., the username) is invalid.

For another example, again based on the Status Code Registry, "5.1.2" or "5xx.1.2" may indicate a bad destination system address, which means the destination email server system specified in the address does not exist or is incapable of accepting mail. More specifically, this status code 2730 may indicate the address portion to the right of the "@" (e.g., the domain/subdomain) is invalid. For example, the address portion to the right of "@" may be a domain, or a subdomain below a domain. A subdomain is a domain that is part of a larger domain. In the domain name system (DNS) hierarchy, a subdomain may be at a lower hierarchy level branching off from a higher domain. For example, an email address may be "user123@home.example.com", in which case "user123" is the username and "home.example.com" is a subdomain within the domain "example.com". The status code "5.1.2" or "5xx.1.2" may indicate the domain or the subdomain is invalid, which may be the case if the domain or subdomain does not exist.

Other commonly accepted status codes 2730 may include: 521, which may indicate that the recipient server does not accept mail; and 556, which may indicate that the server domain does not accept mail.

In some embodiments, a narrative 2750 in the error report 2300B may also assist with identifying a reason for rejecting the email message 2200. For example, FIG. 2B shows the narrative being "the email account that you tried to reach does not exist", which is a clear indication that the recipient email address 2600 is invalid.

Therefore, by parsing the text of the error report 2300B, the system 1200 may determine that the recipient email address 2600 is invalid when the specific reason for rejecting the email message 2200 is one of the following: the recipient email address 2600 does not exist; the recipient email address 2600 is outdated; or the recipient email address 2600 is inactive.

An email address that does not exist can be an email address that has never been created, which may include an erroneous email address that contains typological errors or misspellings in the username or the domain name of the email address. An outdated email address may be an email address with an outdated server domain: for instance, an email address associated with an email server that is no longer in existence or no longer provides email service. An inactive email address is an email address associated with an email user account that is no longer active and cannot be used to send nor receive any email messages.

At operation 306, responsive to determining that the recipient email address 2600 is invalid, the system 1200 may add the invalid email address to a block list 1300 for a defined period of time. The period of time may be defined based on the reason for rejection. The period of time may be based on historical data indicating previous rejection of the same or similar email address, as further elaborated below.

The block list 1300 may be stored within the system 1200, or it may be stored elsewhere and accessible to the system 1200 via a connection or a network.

When an email address is determined to be invalid at a given point in time, the email address may still be associated with a valid recipient in the future. For example, an inactive user email account may be re-activated, or a previously non-existent email address may be registered by a new user. For at least this reason, the system 1200 is configured to keep each email address on the block list 1300 for a defined period of time before removing it from the block list 1300.

In some embodiments, an entry in the block list may include the invalid recipient email address 2600 and a timestamp taken at a time when the invalid recipient email address 2600 is added to the block list. The timestamp may be generated by the system 1200 and include a date and a time, such as, for example, 21-01-03 02:10:35, which means 02:10:35 (HH:MM:SS) on Jan. 3, 2021. The format of the timestamp is a non-limiting example. The entry may further include a defined period of time for the invalid recipient email address 2600, the defined period of time specifying a duration the invalid recipient email address 2600 is to be kept on the block list 1300. For example, the defined period of time may be 50 days or 1,200 hours.

In some embodiments, an entry in the block list 1300 may include a specified expiry date (and/or time) associated with the email address, in addition to (or as an alternative of) the defined period of time for an invalid recipient email address

2600. For example, the system 1200 may, immediately before adding the invalid recipient email address 2600 to the block list 1300, compute an expiry date (and/or time) for the invalid recipient email address 2600 based on the defined period of time as well as a current timestamp. For instance, if the current timestamp is 21-01-03 02:10:35 (yy-mm-dd HH:MM:SS) and the defined period of time for the invalid recipient email address 2600 is 50 days, the expiry date and time would be 21-02-22 02:10:35, i.e., 50 days from 02:10:35 on Jan. 3, 2021.

In some embodiments, all the entries in the block list 1300 may have the same defined period of time; for example, all email addresses in the block list 1300 would expire 3 months after being added. In this instance, only the timestamp taken at the time when each invalid recipient email address 2600 is added to the block list is required to be recorded along with the respective invalid recipient email address 2600. The entries may be ordered such that the oldest entry is at the top or beginning of the block list 1300 and the newest entry is at the bottom or end of the block list 1300. The system 1200 can review the block list 1300 from the top or beginning of the list, and remove each email address 2600 that has expired based on the recorded timestamp, and may stop processing the block list 1300 once it has reached the first entry that has not yet expired.

In some embodiments, for each entry on the block list 1300, the respective defined period of time may vary from one invalid recipient email address 2600 to the next invalid recipient email address 2600. The system 1200 may be configured to generate the respective defined period of time for each invalid recipient email address 2600 at the time of adding the respective invalid recipient email address 2600 to the block list 1300, as further elaborated below.

The system 1200 may determine or generate the defined period of time for each invalid recipient email address 2600 based on at least one of: a username of the invalid recipient email address 2600, a domain of the invalid recipient email address 2600, a reason for rejection indicated in the error report 2300B; and historical data related to the invalid recipient email address 2600.

In one example, the reason for rejection indicated in the error report 2300B may be, for example, the username of the invalid recipient email address 2600 does not exist. In this case, the system 1200 may determine the defined period of time to be equal to or greater than a minimum period of time, e.g., 90 days. This minimum period of time may be predefined and adjusted from time to time.

In some embodiments, when the username of the invalid recipient email address 2600 does not exist based on the error report 2300B, but the username is categorized by the system 1200 as likely being human-generated, the corresponding defined period of time may be determined to be equal to or greater than a first minimum period of time (e.g., 90 days). The first minimum period of time may be predefined and adjusted from time to time. A human-generated username likely contains recognizable words or names in English or a different language. The system 1200 may be configured to analyze the username of the recipient email address 2600 and determine if it contains a recognizable word or proper name in English (or a different language), if it does, then the system 1200 may determine that the recipient email address 2600 likely contains a human-generated username. In some examples, the classification of the username of the email address as a human-generated username or otherwise may be based on natural language processing (NLP), text parsing, and/or using an existing library of common names. For example, one example method of determining if a username, which is a string, likely contains a proper name in English is through the use of a phonetic algorithm for indexing names. A common phonetic algorithm is Soundex, which can be implemented to recognize common English names and their variants.

In some embodiments, when the username of the invalid recipient email address 2600 does not exist based on the error report 2300B, but the username is categorized by the system 1200 as likely being machine-generated (e.g., the username appears to be a randomly generated string such as "do2s6da0si"), the corresponding defined period of time may be determined to be equal to or greater than a second minimum period of time (e.g., 100 days). The second minimum period of time may be predefined and adjusted from time to time. The second minimum period of time may be longer than the first minimum period of time. The system 1200 may determine that the username is likely machine-generated when NLP, text parsing and/or other language analyzing algorithms used by the system 1200 does not recognize any word or proper name (in any language) in the username.

In another example, the reason for rejection indicated in the error report 2300B may be, for example, the domain of the invalid recipient email address 2600 does not exist or is outdated. In this case, the system 1200 may determine the defined period of time to be equal to or greater than a third minimum period of time, e.g., 120 days. This third minimum period of time may be predefined and adjusted from time to time, and longer than the second minimum period of time.

In some embodiments, the historical data may include data indicating previous times, if any, that the respective invalid recipient email address 2600 has been rejected by the same or different recipient email server 1600. If the invalid recipient email address 2600 has been previously rejected, the defined period of time may be determined to be equal to or greater than a fourth minimum period of time. The fourth minimum period of time may be predefined and adjusted from time to time. For example, if the invalid recipient email address 2600 has been previously rejected in the past year, the defined period of time may be determined to be equal to or greater than a minimum of 365 days. For another example, if the invalid recipient email address 2600 has been previously rejected in the past 30 days, the defined period of time may be determined to be equal to or greater than a minimum of 60 days. The historical data may also include data indicating previous times that another similar email address (e.g., same domain but different username; or same username but different domain) has been rejected by the same or different email server 1600, in which case the defined period of time may be determined to be equal to or greater than a fifth minimum period of time that may be predefined and adjusted from time to time.

At operation 308, the system 1200 may receive a request from a sender device 1050 associated with a user of the system 1200, to send an electronic message (i.e., an email) to a recipient email address. This request may include one or more recipient email addresses, such as a request to send an email message to a list of subscribers of an e-marketing campaign. For greater clarity, a recipient email address may be an email address in the TO, CC, or BCC field in the email message, or may be an email address included in a list of recipients for an e-marketing campaign. In some examples, such as the case where the request is related to an e-marketing campaign, the system 1200 may automatically generate email messages to the list of recipients, and the operation 308 may be performed prior to the generation of email messages by the system 1200.

At operation 310, the system 1200 reviews all the recipient email addresses in the request and may determine that one or more recipient email addresses are in the block list 1300. The system 1200 may perform a simple lookup function to look for an exact match of each recipient email address in the block list 1300, and if found, the recipient email address is determined to be invalid by the system 1200 for the purpose of receiving email messages.

For each recipient email address in the block list 1300, the system 1200, at operation 312, is configured to reject the request to send the email message to the respective email address in the block list 1300. For example, when all of the one or more recipient email addresses in the email message are in the block list 1300, the system 1200 may reject the request to send the email message by not relaying the email message to a SMTP server. The system 1200 may, in some embodiments, generate a notification for display at the sender device including a reason for rejecting the email message.

For another example, when the email message in the request is sent to multiple recipient email addresses and only a portion of the multiple recipient email addresses are in the block list 1300, the server 1200 may remove the portion of the multiple recipient email addresses in the block list 1300 from the TO, CC and/or BCC field(s) of the email message, and relay the email message to the appropriate SMTP server 1400 with the recipient email addresses not found in the block list 1300.

In another example, when the request is related to an e-marketing campaign and the system 1200 generates email messages based on a list of recipients defined by the e-marketing campaign, the server 1200 may not generate email messages for the recipient email addresses that are found in the block list 1300, or may generate an email message that includes only recipient email addresses that are not in the block list 1300. In such an example, the system 1200 may or may not edit the list of recipients. For example, the system 1200 may not remove that recipient email address from the list of recipients defined by the e-marketing campaign.

At operation 315, the system 1200 may remove a recipient email address from the block list 1300 after a defined period of time associated with the email address has expired. For example, the system 1200 may check the block list 1300 at a certain frequency (e.g., each calendar day, or each Monday) to remove one or more expired email addresses. In some embodiments, each entry in the block list 1300 may include a respective timestamp recorded when a respective email address is added to the block list 1300, a corresponding defined period of time for the respective email address, and/or a corresponding expiry time for the respective email address. When the system 1200 performs the periodic check of the block list 1300, it may delete an email address from the block list 1300 when the corresponding defined period of time for that email address has passed based on the respective timestamp, or when the corresponding specific expiry time for that email address has been reached. Once removed from the block list, the system 1200 may permit email messages to be sent to the email address again.

In some embodiments, all the entries in the block list 1300 may have the same defined period of time; for example, all email addresses in the block list 1300 would expire 3 months after being added. In this instance, only the timestamp taken at the time when each invalid recipient email address 2600 is added to the block list is required to be recorded along with the respective invalid recipient email address 2600. The entries may be ordered such that the oldest entry is at the top or beginning of the block list 1300 and the newest entry is at the bottom or end of the block list 1300. The system 1200 can review the block list 1300 from the top or beginning of the list, and remove each email address 2600 that has expired based on the recorded timestamp, and may stop processing the block list 1300 once it has reached the first entry that has not yet expired.

The system 1200 may check the block list once a day, once a week, or at any other frequency as set by a system administrator or at a frequency set by the system 1200.

In some embodiments, in addition to or as an alternative of using a defined period of time or an expiry time as means to determine if an email address should be removed from a block list 1300, an email validator process or service may be used to validate email addresses on a block list 1300. For example, if a third-party email validator service recognized by the system 1200 indicates that one or more email addresses are valid, the valid one or more email addresses may be removed from the block list 1300 prior to the expiry of the defined period of time associated with each email address.

In some embodiments, the email validator process or service may be implemented as part of the system 1200. For example, the system 1200, upon receiving a request from a sender device 1050 to verify an email address on the block list 1300, may generate a test email and attempt to send the test email to the email address to be verified. If the test email is successfully delivered to the email address, the email address may be removed from the block list 1300. If the test email is rejected by the recipient email server for any reason, the email address may be kept in the block list 1300, and its associated defined period of time may be updated accordingly, based on the reason for rejection, similar to operations 305 and 306 in the method 300.

In some embodiments, the email validator service may be provided by an external third party that has been approved and recognized by the system 1200. For example, the system 1200, upon receiving a request from a sender device 1050 to verify an email address on the block list 1300, or prior to a time when an email address on the block list 1300 is to be removed from the block list 1300 for any reason, may send the email address to the third party validator service to be verified. If the third party validator service successfully verifies the email address as valid, the email address may be removed from the block list 1300. If the third party validator service determines the email address to be still invalid for any reason, the email address may be kept in the block list 1300, and its associated defined period of time may be updated accordingly, based on the reason for rejection relayed from the third party validator service, similar to operations 305 and 306 in the method 300.

Since using a third party validator service would typically incur costs, in some embodiments, the system 1200 may be configured to permit the use of third party validator service only in select cases, e.g., only for email addresses that are highly suspicious (e.g., suspected to be machine-generated addresses) prior to, or at the time that the email addresses would be removed from the block list 1300, or upon an explicit request from a user, and possibly only if the user pays an additional fee, or only when the user account is verified to be a higher-tier user/subscriber to the email service system 1200.

In some embodiments, the system 1200 has access to one or more email servers (e.g., SMTP servers 1400) of varying degrees of reputation level. In one example, after a previously invalid email address has been taken off the block list 1300 by the system 1200 in operation 315 of the method 300, a first email message intended for the previously invalid email address may be sent from a less reputable email server, to avoid contaminating the reputation of a reputable email server, in the event that the email address is still invalid for any reason.

In another example, after a previously invalid email address has been taken off the block list 1300 by the system 1200 in operation 315 of the method 300, a first email message intended for this email address may be sent from the most reputable email server. For example, if the sender device 1050 of the email message is associated with a user account, which may be a trusted user account, with a zero or minimal record of rejected email messages, then a high reputation email server may be used to send out the email message. For another example, when the first email message (to the email address just taken off the block list 1300) is part of an email marketing campaign carried out by a user account of the system 1200 intended for a group of recipient email addresses (e.g., a subscriber list), and when said email marketing campaign is determined to have a very low likelihood of being rejected by any of the recipient email addresses, the system 1200 may use a high reputation email server to send the email message to the email address just taken off the block list 1300. This way, in the event the email address is still invalid, the negative effect from a single rejected email message is quite low for the email marketing campaign as a whole, and therefore below a threshold the recipient email server may have that would materially affect the reputation of the high reputation email server.

In some embodiments, an email marketing campaign may be determined to have a sufficiently low likelihood of being rejected by any of the recipient email addresses when the user account associated with a sender of the email marketing campaign has in the past successfully delivered email marketing campaigns without any rejected recipient email addresses.

In some embodiments, when the system 1200 receive a request to send an email message to a recipient email address still on the block list 1300, and when the request is part of an email marketing campaign carried out by a user account of the system 1200 intended for a group of recipient email addresses (e.g., a subscriber list), as an optional step, the system 1200 may check to see if the request comes from a user account associated with high quality email marketing campaign(s) in the past based on available historical data. Such a user account may be deemed a trusted user account. If it is, even if one or more recipient email addresses in the request are found in the block list 1300, the email message may still be sent to the one or more email addresses despite being on the block list 1300. Any successfully delivered email message to any of the email addresses in the block list 1300 may be used to remove the respective email address(es) from the block list 1300.

In general, high quality marketing campaigns can include historical campaigns that have had high click-through, high open rate, low spam rate, and/or other things that the email service system 1200 would recognize to be positive indicators for a successful email marketing campaign An Example e-Commerce Platform Although integration with a commerce platform is not required, in some embodiments, the methods disclosed herein may be performed on or in association with a commerce platform such as an e-commerce platform. Therefore, an example of a commerce platform will be described.

Figure 4:
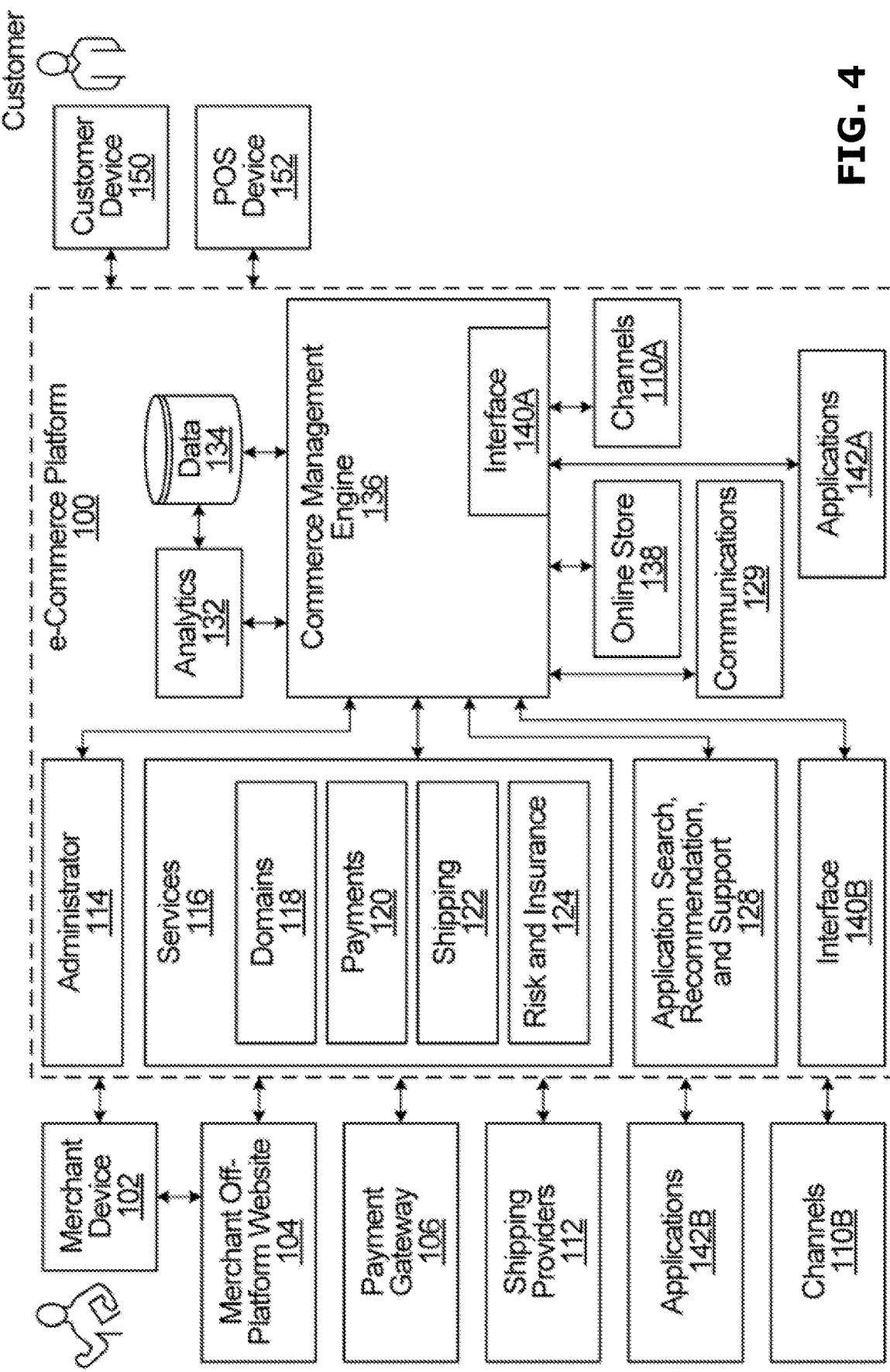
FIG. 4 is a block diagram of an example e-commerce platform, in which examples described herein may be implemented.

FIG. 4 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 4, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a transitory memory such as for example, random access memory (RAM), and/or a non-transitory memory such as, for example, a non-transitory computer readable medium such as, for example, persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

FIG. 5 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 5. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 4, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementation in an e-Commerce Platform

Figure 6:
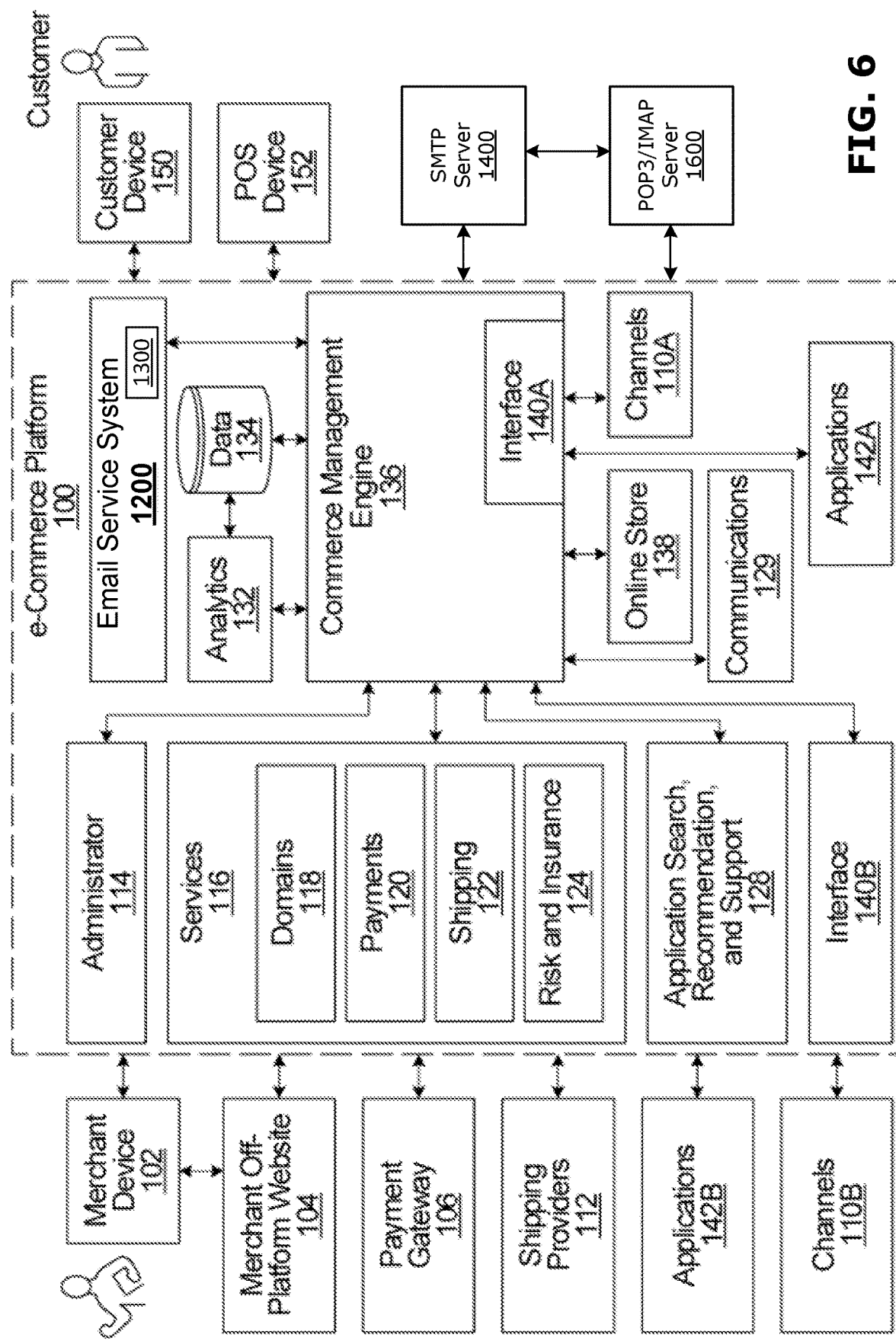
FIG. 6 is another block diagram of the e-commerce platform of FIG. 4, showing some details related to the email service system.

The functionality described herein may be used in commerce to provide improved customer or buyer experiences. The e-commerce platform 100 could implement the functionality for any of a variety of different applications, examples of which are described elsewhere herein. FIG. 6 illustrates the e-commerce platform 100 of FIG. 4 but including an email service system 1200. The email service system 1200 is an example of a computer-implemented system that implements the functionality described herein for use by the e-commerce platform 100, the customer device 150 and/or the merchant device 102.

Although the email service system 1200 is illustrated as a distinct component of the e-commerce platform 100 in FIG. 6, this is only an example. An email service system 1200 could also or instead be provided by another component residing within or external to the e-commerce platform 100. In some embodiments, the email service system 1200 may be implemented as part of the communications facility 129 for providing, managing, and controlling electronic communications and marketing for one or more merchants, such as utilizing an electronic messaging facility for collecting and analyzing communication interactions between merchant devices 102 and customer devices 150.

In some embodiments, either or both of the applications 142A-B provide an email service system 1200 that implements the functionality described herein to make it available to customers and/or to merchants. Furthermore, in some embodiments, the commerce management engine 136 provides the functionalities of the email service system 1200. However, the location of the email service system 1200 is implementation specific. In some implementations, the email service system 1200 is provided at least in part by an e-commerce platform, either as a core function of the e-commerce platform or as an application or service supported by or communicating with the e-commerce platform. Alternatively, the email service system 1200 may be implemented as a stand-alone service to clients such as a merchant device 102.

As part of the e-commerce platform 100, the email service system 1200 may be connected, via a network, to one or more SMTP server 1400 and one or more POP3/IMAP server 1600. A merchant device 102 may act as a sender device 1050 in FIG. 1, and the merchant device 102 may be associated with a merchant's account, which may be authenticated by the e-commerce platform 100 (e.g., through verification of merchant ID and password). Once authenticated, the merchant device 102 may send one or more email messages to one or more recipient email addresses using the email service system 1200. Some of the recipient email addresses may be associated with customer devices 150.

In some embodiments, a merchant device 102 may send a request for an email marketing campaign to one or more recipient email addresses via the communication facility 129. The communication facility 129 may be configured to call upon the email service system 1200 to: 1) review the one or more recipient email addresses included in the email marketing campaign; and 2) process the merchant's request to send the email message to the one or more recipient email addresses in accordance with the method 300. In other embodiments, the request for an email marketing campaign from a merchant device 102 may be routed directly to the email service system 1200 for processing.

In some embodiments, the email service system 1200 receives the request for an email marketing campaign and a subscriber list from the merchant device 102 (either directly, or via the communication facility 129), and processes the request to send an email message to one or more recipient email addresses in the subscriber's list. The email service system 1200 may first remove, from the subscriber list, any recipient email address in a block list 1300 in accordance with the process described in method 300 in FIG. 3, and send the email message to the remaining recipient email addresses in the subscriber list using one or more SMTP servers 1400. If and when any of the email messages to the remaining recipient email addresses are rejected by a recipient email server due to any permanent failure caused by an invalid recipient email address, the invalid recipient email address may be added as an entry to the block list 1300.

In some cases, when an invalid recipient email address that is part of a subscriber list is added as an entry to the block list 1300, the corresponding entry in the block list 1300 for the invalid recipient email address may include a subscriber list ID, such that the email service system 1200 may track the email addresses in the block list 1300 by subscriber list ID. In some examples, the corresponding entry in the block list 1300 for the invalid recipient email address may further include a merchant ID associated with the sender of the email message, such that the email service system 1200 may track the email addresses in the block list 1300 by sender/merchant ID.

In some embodiments, a recipient email address may be included in a customer profile stored on the e-commerce platform 100 and associated with a corresponding customer ID of the customer profile. Each customer profile may include an engagement score. The engagement score may indicate a level of engagement with the customer. For example, if the customer has proactively or explicitly opted out of any form of electronic communication including email messages, the engagement score in the customer profile for this customer may be set to zero. In other words, an engagement score of zero in a customer profile effectively prevents any electronic message to be sent to the email address in the customer profile.

The email service system 1200 may, in addition to or as an alternative of a block list 1300 of email addresses, store and manage a list of blocked customer IDs, where each entry in the list of blocked customer IDs includes a customer ID and a defined period of time or expiry time, which are similar to the defined period of time or expiry time used in a block list 1300. When an email address in a customer profile is determined to be invalid due to a rejected email message from a recipient email server based on a process similar to operation 305 in method 300, the customer ID may be added to the list of blocked customer IDs, and in turn, the engagement score field in the customer profile may be set to zero.

When the defined period of time has expired for a customer ID in the list of blocked customer IDs, or when the respective email address associated with the customer ID has been determined to be valid (e.g., a successful delivery of an email message by a validator service) before the defined period of time has expired, the email service system 1200 may remove the customer ID from the list of blocked customer IDs, and in turn set the engagement score field in the customer profile associated with the customer ID to a non-zero value (e.g., set to some default neural value).

When the communication facility 129 and/or the email service system 1200 needs to generate a list of recipient email addresses based on a given list of customer IDs (e.g., according to parameters of an email marketing campaign requested by a merchant's account), the email service system 1200 simply filters out or removes all the email addresses in the customer profiles having an engagement score of zero, prior to processing the request to send an email message to the list of customers identified by the list of customer IDs.

In some embodiments, the e-commerce platform 100 may be configured to measure each merchant's email reputation or email trustworthiness individually, based on, for example, a total number of invalid recipient email addresses in each request for an email marketing campaign sent from the merchant's account. These measurements can determine the level of email service the merchant's account can receive from the e-commerce platform 100. For example, a request for an email marketing campaign from a merchant's account that has a minimal amount of invalid recipient email addresses may be sent from a high reputation email server. For another example, a request for an email marketing campaign from a merchant's account that has more than the minimal amount of invalid recipient email addresses may be sent from less reputable servers.

In some embodiments, other than removing email addresses from the block list 1300 (or removing customer IDs from a list of blocked customer IDs) based on the defined period of time or the expiry time, there may be other ways to remove an email address from the block list 1300 (or removing customer IDs from the list of blocked customer IDs) prior to expiry of the defined period of time. For example, if a current email marketing campaign is launched by a merchant's account that is associated with high quality marketing campaigns based on historical data, one or more email addresses contained in the current marketing campaign, even if found in the block list 1300 (or associated with customer IDs in the list of blocked customer IDs), may still be permitted to be included in the marketing campaign so that an email message in the marketing campaign may be sent to all the email addresses (or to all the customers identified in the list of customer IDs given by the merchant) specified in the parameters of the marketing campaign.

After the current marketing campaign is run, if and when an email address in the block list 1300 (or associated with a customer ID in the list of blocked customer IDs) has successfully received the email messages, the email address may be removed from the block list 1300 (or the associated customer ID may be removed from the list of blocked customer IDs and the corresponding engagement score set to a non-zero value), regardless of when the defined period of time may expire. In this regard, high quality marketing campaigns can include historical campaigns that have had high click-through, high open rate, low spam rate, and/or other things that the communications facility 129 (or the email service system 1200) would recognize to be positive indicators for a successful email marketing campaign.

The example embodiments discussed herein may be implemented to manage other types of electronic messaging, such as for example, messages on a social media platform (e.g., WhatsApp™) or text messages to phone numbers. For instance, a temporary block list can be maintained for phone numbers in a short message service (SMS) marketing campaign, where the phone numbers may be determined to be invalid due to a typo in entering a phone number, or deactivated. When an electronic message needs to be sent to a given list of recipients based on phone numbers, the system 1200 may be configured to remove, from the given list of recipients, any phone number already on the temporary block list before sending the message to the phone numbers remaining in the given list of recipients using messaging services from a wireless telecommunications provider. And when any text message is rejected by the wireless telecommunications provider due to an invalid phone number, the invalid phone number may be added to the temporary block list along with a corresponding defined period of time.

Although the present disclosure describes methods and processes with operations (e.g., steps) in a certain order, one or more operations of the methods and processes may be omitted or altered as appropriate. One or more operations may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A computer-implemented method for controlling electronic message transmission at an email service system, the method comprising:
   receiving, via a network, an error report generated based on a response from a recipient email server responsive to an attempt to send a message to an email address associated with the recipient email server, the error report indicating that the attempt to send the message was rejected by the recipient email server;
   adding the email address to a block list, wherein any subsequent attempt to send messages from the email service system to the email address is blocked based on the email address being in the block list for a defined period of time;
   receiving, from a user account, a request to send a further message to the email address;
   determining that the request was received prior to an expiration of the defined period of time and that the email address is in the block list;
   responsive to determining that the request was received prior to the expiration of the defined period of time and that the email address is in the block list, determining that the user account requesting to send the further message to the email address is a trusted user account; and
   responsive to determining that the user account requesting to send the further message to the email address is a trusted user account:
      permitting the request to send the further message to the email address;
      receiving a confirmation that the email address is valid; and
      in response to receiving the confirmation that the email address is valid, removing the email address from the block list prior to the expiration of the defined period of time.

2. The method of claim 1, further comprising:
   determining the defined period of time based on at least one of: a username of the email address; a domain of the email address; a reason for rejection indicated in the error report; and historical data related to the email address.

3. The method of claim 2, wherein the historical data comprises data indicating previous times, if any, that the email address has been rejected by a recipient email server.

4. The method of claim 2, wherein the defined period of time is set to be equal to or greater than a first minimum period of time when the username of the email address is categorized as being human-generated, and the defined period of time is set to a longer second minimum period of time when the username of the email address is categorized as being machine-generated.

5. The method of claim 4, wherein the defined period of time is set to a longest third minimum period of time responsive to the reason for rejection indicated in the error report being that the domain of the email address does not exist.

6. The method of claim 1, further comprising, subsequent to removing the email address from the block list:
   receiving a request to send a second further message to the email address;
   determining that the email address is not in the block list; and
   permitting the request to send the second further message to the email address.

7. The method of claim 6, wherein permitting the request to send the second further message to the email address comprises:
   determining an email server from a plurality of available email servers available to the email service system for sending the second further message to the email address based on a reputation level of the determined email server relative to a remainder of the email servers from the plurality of available email servers; and
   permitting the request to send the second further message to the email address using the determined email server.

8. The method of claim 1, further comprising, for a second email address in the block list, prior to an expiration of a corresponding defined period of time:
   sending the second email address to an external email validator for verification;
   receiving, from the external email validator, a confirmation that the second email address is valid; and
   in response to receiving the confirmation that the second email address is valid, removing the second email address from the block list.

9. The method of claim 1, wherein determining whether the user account requesting to send the further message to the email address is a trusted user account is carried out based on historical data.

10. The method of claim 1, wherein the error report indicates at least one of: the email address being invalid; the email address does not exist; the email address being outdated; or the email address being inactive.

11. The method of claim 1, further comprising:
   periodically checking each entry in the block list, wherein a second email address on the block list is removed from the block list responsive to detecting, as a part of a periodic check, that a corresponding defined period of time has passed.

12. The method of claim 1, wherein the error report is generated by a Simple Mail Transfer Protocol (SMTP) server and comprises one or more SMTP status codes.

13. An email service system for controlling electronic message transmission, the email service system comprising a processor in communication with storage, the processor configured to execute instructions from the storage to cause the email service system to:
receive, via a network, an error report generated based on a response from a recipient email server responsive to an attempt to send a message to an email address associated with the recipient email server, the error report indicating that the attempt to send the message was rejected by the recipient email server;
add the email address to a block list, wherein any subsequent attempt to send messages from the email service system to the email address is blocked based on the email address being in the block list for a defined period of time;
receive, from a user account, a request to send a further message to the email address;
determine that the request was received prior to an expiration of the defined period of time and that the email address is in the block list;
responsive to determining that the request was received prior to the expiration of the defined period of time and that the email address is in the block list, determine that the user account requesting to send the further message to the email address is a trusted user account; and
responsive to determining that the user account requesting to send the further message to the email address is a trusted user account:
permit the request to send the further message to the email address;
receive a confirmation that the email address is valid; and
in response to receiving the confirmation that the email address is valid, remove the email address from the block list prior to the expiration of the defined period of time.

14. The email service system of claim 13, wherein the processor is further configured to execute instructions from the storage to cause the email service system to:
determine the defined period of time based on at least one of: a username of the email address, a domain of the email address, a reason for rejection indicated in the error report; and historical data related to the email address.

15. The email service system of claim 14, wherein the historical data comprises data indicating previous times, if any, that the email address has been rejected by a recipient email server.

16. The email service system of claim 14, wherein the defined period of time is set to be equal to or greater than a first minimum period of time when the username of the email address is categorized as being human-generated, and the defined period of time is set to a longer second minimum period of time when the username of the email address is categorized as being machine-generated.

17. The email service system of claim 16, wherein the defined period of time is set to a longest third minimum period of time responsive to the reason for rejection indicated in the error report being that the domain of the email address does not exist.

18. The email service system of claim 13, wherein the processor is further configured to execute instructions from the storage to cause the email service system to, subsequent to removing the email address from the block list:
receive a request to send a second further message to the email address;
determine that the email address is not in the block list; and
permit the request to send the second further message to the email address.

19. The email service system of claim 18, wherein the processor is configured to execute instructions from the storage to cause the email service system to:
determine an email server from a plurality of available email servers available to the email service for sending the second further message to the email address based on a reputation level of the determined email server relative to a remainder of the email servers from the plurality of available email servers; and
permit the request to send the second further message to the email address using the determined email server.

20. The email service system of claim 13, wherein the processor is configured to execute instructions from the storage to cause the email service system to, for a second email address in the block list, prior to an expiration of a corresponding defined period of time:
send the second email address to an external email validator for verification;
receive, from the external email validator, a confirmation that the second email address is valid; and
in response to receiving the confirmation that the second email address is valid, remove the email address from the block list.

21. The email service system of claim 13, wherein the processor is configured to execute instructions from the storage to further cause the email service system to:
responsive to determining that the user account requesting to send the further message to the email address is not a trusted user account, block the request to send the further message to the email address.

22. The email service system of claim 13, wherein determining whether the user account requesting to send the further message to the email address is a trusted user account is carried out based on historical data.

23. The email service system of claim 13, wherein the processor is further configured to execute instructions from the storage to cause the email service system to:
periodically check each entry in the block list, wherein a second email address on the block list is removed from the block list responsive to detecting, as a part of a periodic check, that a corresponding defined period of time has passed.

24. A computer-readable storage medium storing instructions that, when executed by a processor of an email service system, cause the email service system to:
receive, via a network, an error report generated based on a response from a recipient email server responsive to an attempt to send a message to an email address associated with the recipient email server, the error report indicating that the attempt to send the message was rejected by the recipient email server;
add the email address to a block list, wherein any subsequent attempt to send messages from the email service system to the email address is blocked based on the email address being in the block list for a defined period of time;

receive, from a user account, a request to send a further message to the email address;

determine that the request was received prior to an expiration of the defined period of time and that the email address is in the block list;

responsive to determining that the request was received prior to the expiration of the defined period of time and that the email address is in the block list, determine that the user account requesting to send the further message to the email address is a trusted user account; and responsive to determining that the user account requesting to send the further message to the email address is a trusted user account:

permit the request to send the further message to the email address;

receive a confirmation that the email address is valid; and in response to receiving the confirmation that the email address is valid, remove the email address from the block list prior to the expiration of the defined period of time.

25. The computer-readable storage medium of claim 24, wherein the instructions further cause the email service system to:

responsive to determining that the user account requesting to send the further message to the email address is not a trusted user account, block the request to send the further message to the email address.

* * * * *